(12) United States Patent      (10) Patent No.: US 8,467,536 B2
Lewis et al.      (45) Date of Patent: Jun. 18, 2013

(54) BINDING KEYS TO SECURE MEDIA STREAMS

(75) Inventors: Adam C. Lewis, Buffalo Grove, IL (US); Thomas S. Messerges, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 256 days.

(21) Appl. No.: 12/962,906

(22) Filed: Dec. 8, 2010

(65) Prior Publication Data

US 2012/0148050 A1    Jun. 14, 2012

(51) Int. Cl.
*H04L 9/00*      (2006.01)
*H04L 9/08*      (2006.01)
*H04L 29/06*      (2006.01)
*H04K 1/00*      (2006.01)

(52) U.S. Cl.
USPC ............ 380/284; 380/43; 380/247; 380/270; 380/281; 713/162; 713/171

(58) Field of Classification Search
USPC .................. 380/278, 43, 239, 247, 270, 281, 380/284; 713/162, 171
See application file for complete search history.

(56) References Cited

U.S. PATENT DOCUMENTS

| 2007/0294186 | A1* | 12/2007 | Yan | ................................. | 705/71 |
| 2009/0006844 | A1* | 1/2009 | Wing et al. | ................... | 713/156 |
| 2009/0182668 | A1* | 7/2009 | Lee | ................................ | 705/50 |
| 2010/0183151 | A1* | 7/2010 | Wing et al. | ................... | 380/257 |

OTHER PUBLICATIONS

International Search Report and Written Opinion for International Application No. PCT/US2011/063521 mailed on Apr. 12, 2012.
Arkko, J., et al., "MIKEY: Multimedia Internet KEYing," Network Working Group, RFC: 3830, Aug. 2004.
Arkko, J., et al., "Key Management Extensions for Session Description Protocol (SDP) and Real Time Streaming Protocol (RTSP)," Network Working Group, RFC: 4567, Jul. 2006.
Handley, M., et al., "SDP: Session Description Protocol," Network Working Group, RFC: 4566, Jul. 2006.
Harrison, R., et al., "The Lightweight Directory Access Protocol (LDAP) Intermediate Response Message," Network Working Group, RFC: 3771, Apr. 2004.
OMA Open Mobile Alliance, "Service and Content Protection for Mobile Broadcast Services," Candidate Version 1.0, Aug. 7, 2008.

(Continued)

*Primary Examiner* — Mohammad W Reza
(74) *Attorney, Agent, or Firm* — Steven A. May; Barbara R. Doutre (57) ABSTRACT

A key message can include a key-encryption-key (KEK) associated with a KeyDomainID and a KeyGroupID. A session description message can describe streaming media initialization parameters containing media stream information for one or more media streams. For each media stream, the media stream information can include an IP address and a data port. The session description message can further contain a linkage for binding the KEK to a corresponding one of the media streams. The linkage can include the KeyDomainID and KeyGroupID or can include an abstract representation of the KeyDomainID and KeyGroupID. During session initialization, the key-encryption-key (KEK) can be bound to the media streams using the linkage of the session description message. Each of the media streams can be secured using a traffic key conveyed to user equipment (UE) under protection of the key-encryption-key (KEK).

20 Claims, 5 Drawing Sheets

OTHER PUBLICATIONS

The 3rd Generation Partnership Project (3GPP TS 33 246)—Specification Detail—3G Security; Security of Multimedia Broadcast/Multicast Service (MBMS), Release 8—Extracted from: http://www.3gpp,org/ftp/Specs/html-info/33246.htm—4 pages.

Homeland Security—Safecom—Public Safety Voice Over Internet Protocol Working Group Home—About Voice over Internet Protocol—Extracted from: http/www.safecomprogram.gov/SAFECOM/currentprojects/voip/—4 pages.

* cited by examiner

Security Description 100

```
<?xml version = "1.0" encoding = "UTF-8"?>
<securityDescription
        xmlns= "urn:3GPP:metadata:2005:MBMS:securityDescription"
        xmlns:xsi= "http://www.w3.org/2001/XMLSchema-instance">
```

Key Management Information 110
```
<keyManagement
        offsetTime= "5"
        randomTimePeriod= "10"
        uiccKeyManagement= "true"
        <serverURI>http://register.operator.umts/</serverURI>
        <serverURI>http://register2.operator.umts/</serverURI>
</keyManagement>
<keyId>
```

Binding of Key ID to Media Stream 120
```
    <mediaFlow   flowID= "224.1.2.3 / 4002">       (142) (144)
        <MSK>
                <keyDomainID>aMoM</keyDomainID>
                <MSKID>aMoAAA==</MSKID>
        </MSK>                                      (146)
    </mediaFlow>
    <mediaFlow   flowID= "224.1.2.3 / 4004">
        <MSK>
                <keyDomainID>GM8M</keyDomainID>
                <MSKID>aMkAAA==</MSKID>
        </MSK>
    </mediaFlow>
</keyId>
```

Forward Error Correction Information 130
```
<fecProtection
        fecEncodingId= "1"
        fecInstanceId= "0"
        fecOtiExtension= "1SCxWEMNe397m24SwgyRhg=="/>
</securityDescription>
```

Extend SDP Message: 410

1. GCKS sends a MIKE Y message to UE comprising:
   - MSK | MSK ID (including KeyDomainId = 0xABCDEF, KeyGroup = 0x1234)

2. SIP server send an SDP message[1] to UE comprising:
   - KeyDomainId = 0xABCDEF
   - KeyGroup = 0x1234
   - RX addressing (o=IN IP4 224.2.2.0/4002)
   - TX addressing (o=IN IP4 10.2.2.0/4004)

Binding based on Key IDs

3. UE uses KeyDomainID and KeyGroup to bind the MIKE Y-delivered keys to the SDP-delivered RX and TX IP address and ports.

---

Extend SDP Message and Add DM function: 420

1. GCKS sends a MIKE Y message to UE comprising:
   - MSK | MSK ID (including KeyDomainId, KeyGroup)

2. DM function[1] sends and X ML-based security description to UE containing KeyDomainId, KeyGroup, and TalkGroup1@agency.gov 3. SIP server sends and SDP message to UE comprising:
   - TalkGroup1@agency.gov
   - RX addressing (o=IN IP4 224.2.2.0/4022)
   - TX addressing (o=IN IP4 10.2.2.0/4004)

Binding based on URI

4. UE uses TalkGroup1@agency.gov as the "glue" to bind the MIKE Y-delivered KeyDomainId and KeyGroup (and associated keys) to the SDP-delivered RX and TX IP address and ports.

FIG. 4A

Extend SDP and MIKE Y Messages:
430

1. GCKS sends a MIKE Y message to UE comprising:
   - MSK | MSK ID (including <u>KeyDomainId, KeyGroup</u>) | <u>TalkGroup1@agency.gov</u>

2. SIP server send an SDP message to UE comprising:
   - <u>TalkGroup1@agency.gov</u>  ← Binding based on URI
   - RX addressing (o=IN IP4 224.2.2.0/4002)
   - TX addressing (o=IN IP4 10.2.2.0/4004)

3. UE uses <u>TalkGroup1@agency.gov</u> as the "glue" to bind the MIKE Y-delivered keys to the SDP-delivered RX and TX IP address and ports.

---

Extend SDP Message and MAP URI and Key IDs to Each Other:
440

1. GCKS sends a MIKE Y message to UE comprising:
   - MSK | MSK ID (including KeyDomainId = 0xABCDEF, KeyGroup = 0X1234)

2. SIP server send an SDP message to UE comprising:
   - TalkGroup1234@agencyABCDEF.gov  ← Binding based on mapping function
   - RX addressing (o=IN IP4 224.2.2.0/4002)
   - TX addressing (o=IN IP4 10.2.2.0/4004)

3. UE uses a mapping function to convert the URI directly to the <u>KeyDomainId</u> and <u>KeyGroup</u> values (or vice versa), thus creating a binding between the keys and the SDP-delivered RX and TX IP address and ports.

Example Mapping:
<u>TalkGroup1234@agencyABCDEF.gov</u> maps to KeyDomainId = 0xABCDEF, Key Group = 0x1234

FIG. 4B

BINDING KEYS TO SECURE MEDIA STREAMS

BACKGROUND

The present invention relates to the field of secure, real-time media communications and, more particularly, to binding keys to secure media streams.

There is an increasing need for providing secure multimedia services to user equipment (UE), such as two way radios and mobile phones. Secure media services can involve transmission of encrypted media streams, which are encrypted/decrypted using a transmission key. These transmission keys can be managed and distributed by group controller/key servers (GCKS) of a key-management system. Key-management systems can distribute the keys in accordance with any number of keying protocols, one of which is the Multimedia Internet KEYing (MIKEY) protocol.

Figure 1:
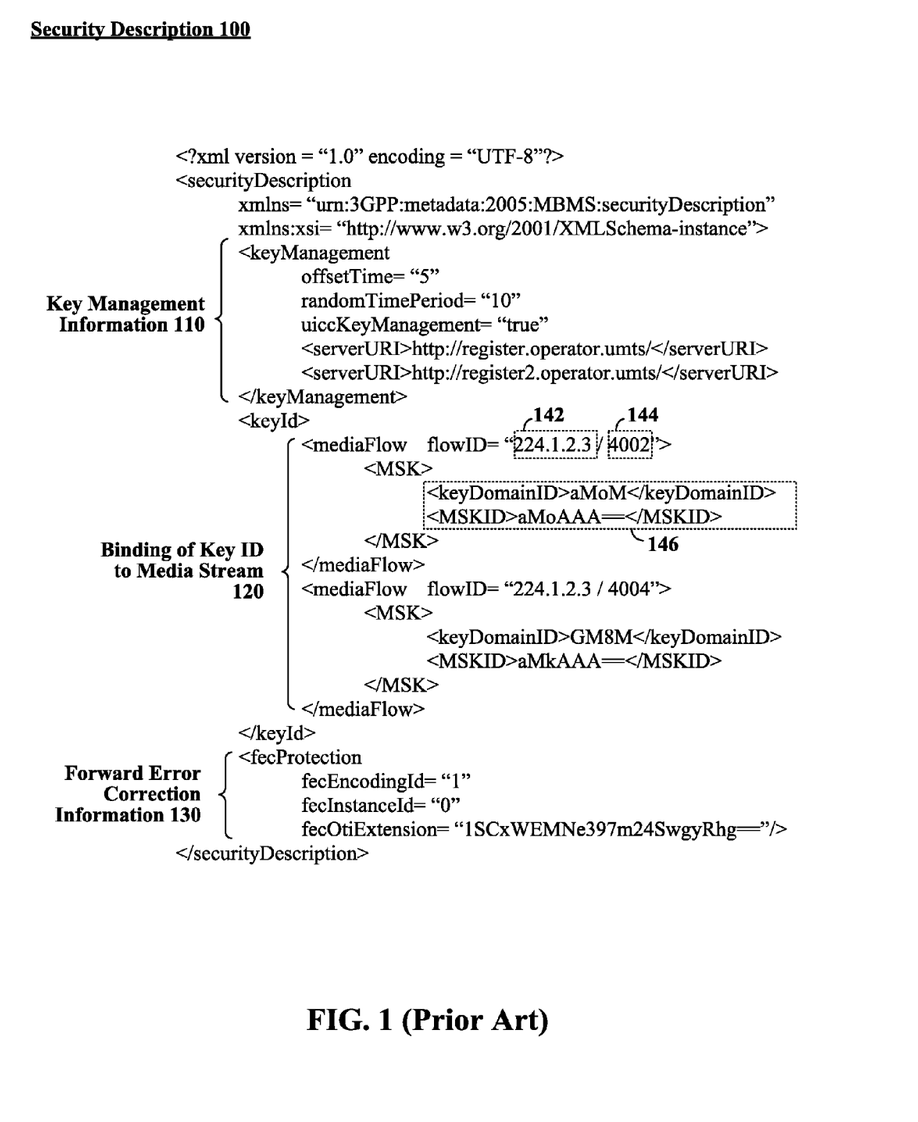
FIG. 1 (Prior Art) shows a sample security description document.

Some solutions for media streams, such as Multimedia Broadcast and Multicast Services (MBMS) and Open Mobile Alliance Push to talk Over Cellular (OMA POC), exist that address issues of secure group communications. MBMS communications can require key to stream bindings. To elaborate, the MBMS approach handles key to stream binding using a three-pronged approach. First keys are delivered via MIKEY. Next, media stream information is conveyed via Session Description Protocol (SDP). Finally a binding between the MIKEY keys and the SDP streams takes place in an Extensible Markup Language (XML) document referred to as the security description. FIG. 1 (Prior Art) shows a sample security description 100 document, which includes key-management information 110, information to bind a Key ID to a media stream 120, and error-correction information 130. The binding information (120) can identity a media flow (e.g., a stream) by IP address 142 and port 144. A group of MBMS Service Keys (MSK) can be identified by KeyDomainID and KeyGroup 146. Individual keys within that group are further identified by KeyNumber. A specific KeyNumber is not particularly important for purposes of binding traffic keys sent via any of the group keys to a media flow.

The MBMS approach (and the OMA POC one) has non-desirable characteristics for Trunked and Conventional Public Safety services running over Long Term Evolution (LTE). Specifically, uses of the MBMS approach for public-safety applications have issues with reliability and delay. The delay is partially a result of a requirement of sending a separate document (e.g., the security description document) to bind keys and streams together. For example, as conventionally implemented, a talkgroup call can begin after the SDP is received and the floor grant is received. With the MBMS approach, the infrastructure needs to send the security description after or along with the SDP to the mobile device. Traditionally, the security description includes IP address 142 and port 144 information that may not be known a priori.

Additionally, coordinating the sending of the security description from a device management (DM) function and the SDP from a Session Initiation Protocol (SIP) typically occurs in a non-synchronized manner. Current delays inherent when sending the security document can be highly problematic, as boundaries for call setup time requirements are already being pushed to their limits.

BRIEF SUMMARY

One aspect of the disclosure can include a method, computer program product, system, and apparatus for binding security keys to secure media. In this aspect, a key message can be received that comprises a key-encryption-key (KEK) having a KeyDomainID and a KeyGroupID. A session description message can be received that describes streaming media initialization parameters comprising media stream information for one or more secure media streams. For each of the secure media streams, the media stream information can include an IP address and a data port. The session description message can further comprise a linkage for binding the KEK to a corresponding one of the secure media streams. The linkage can include the KeyDomainID and KeyGroupID or can include an abstract representation (a Uniform Resource Identifier or URI, for example) of the KeyDomainID and KeyGroupID. During session initialization, the key-encryption-key (KEK) can be bound to the secure media streams using the linkage of the session description message. During the session, each of the secure media streams can be secured using a traffic key conveyed to the user equipment (UE) under protection of the key-encryption-key (KEK).

Another aspect of the disclosure is for user equipment (UE) for securely communicating via voice over broadband across a trunked two-way radio network. The UE can include a transmitter, a receiver, a push-to component, a packetizer, at least one audio transducer, a cryptography engine, and a session establishment engine. The cryptography engine can use a traffic key to encrypt/decrypt traffic. The session establishment engine can establish a secure communication session that includes an incoming audio stream and an outgoing audio stream. Additionally, the session establishment engine can bind a key-encryption-key (KEK) that is associated with a KeyDomainID and a KeyGroupID to the incoming and outgoing streams. The binding of KEK to streams can use a linkage conveyed within a session description message.

DETAILED DESCRIPTION

The disclosure provides a solution for initiating a communication session involving secure media streams and transmission keys. In the solution, media streams are bound to key-encryption-keys (KEKs) via a KEK identifier. In one example, KeyDomainID plus KeyGroup can be used for the media stream binding.

In the disclosed solution, the linkage between media stream(s) and keys can take different forms, depending on selected implementation choices. In one embodiment, both the key-management message and the SDP message can specify a KeyDomainID and KeyGroup, where the user equipment (UE) can use the KeyDomainID and the KeyGroup to bind the keys to corresponding stream Internet Protocol (IP) addresses and User Datagram Protocol (UDP) ports. In another embodiment, the SDP message can include a Uniform Resource Locator (URL) that is mapped to a KeyDomainID and KeyGroup of a key-management message. This embodiment can require a security description message that links the KeyDomainID, KeyGroup, and URL. In another embodiment, both the key-management message and the SDP message can include a URL that is mapped to a KeyDomainID and KeyGroup. In another embodiment, a URI can be constructed using a mapping function, such that the URI has encoded extractable values for the KeyDomainID and the KeyGroup. This URI can be conveyed in the SDP message.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
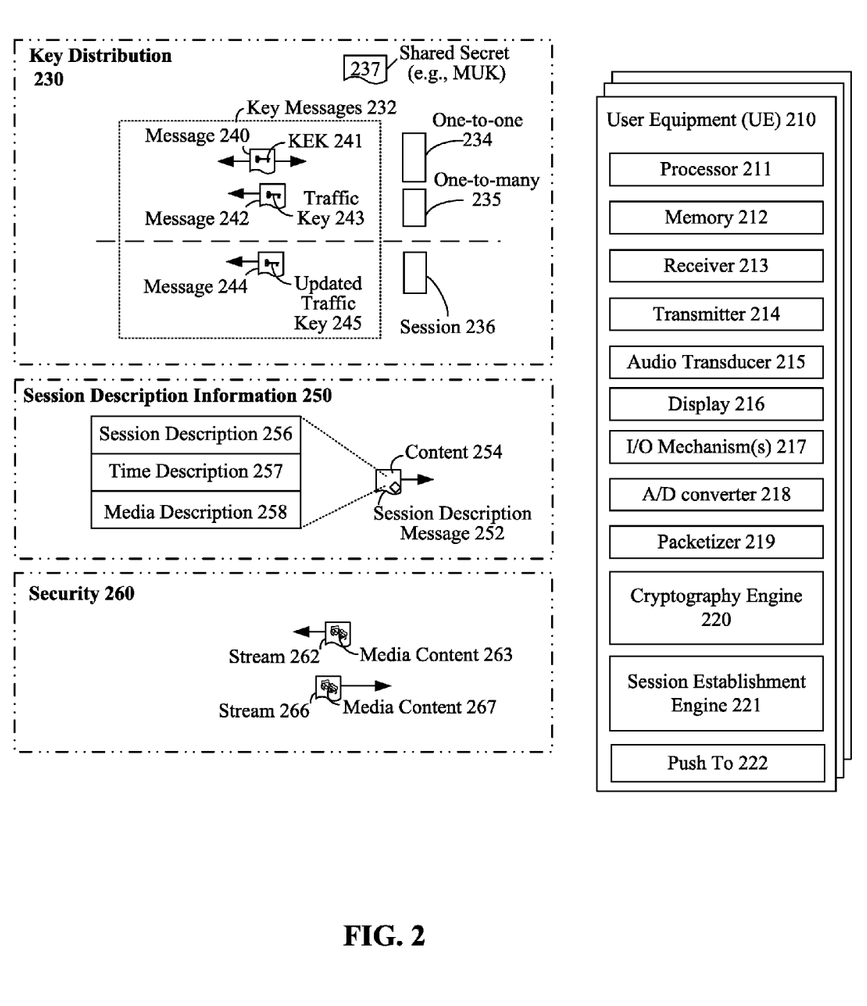
FIG. 2 illustrates a binding of key-encryption-keys (KEK) to secure media streams within user equipment in accordance with an embodiment of the disclosure.

FIG. 2 illustrates a binding of key-encryption-keys (KEK) 241 to media streams within user equipment 210 in accordance with an embodiment of the disclosure. Before a binding occurs, key distribution 230 takes place and session information 250 is conveyed. The binding occurs during session initiation, before secure media streams are conveyed. The traffic key 243 is conveyed under the protection of KEK 241 during key distribution 230. Traffic key 243 is used to derive session keys used to encrypt and decrypt the media streams. Thus, the traffic key 243 provides a means for securely conveying media streams (see security diagram 260), such as stream 262 and 266, to and from the user equipment (UE) 210.

More specifically, the session description content 254 conveyed in the session description message 252 can include an identifier for an IP address and data port for each of media streams 262, 266 that is to be bound. The session description message 252 can also include a linkage to the KEK (or group of KEKs). More specifically, the linkage can specify the Key Domain and the Key group of the KEK 241, which is also the Key Domain and Key Group of any traffic key 243 that is conveyed under the protection of this KEK 241. Use of the phrase "binding the KEK to the media stream" implies that a traffic key 243 is delivered to the UE 210 under protection of the KEK 241. The ultimate binding is really between the media streams 262, 266 and the traffic keys 243. Key distribution 230 can conform to a Multimedia Internet KEYing (MIKEY) protocol (Request for Consideration or RFC 3830 of the Internet Engineering Task Force or IETF) in one embodiment.

The message 240 is protected by the shared secret 237 is only able to be sent via a one-to-one channel 234. Message 242, which contains the traffic key 243 and which is protected by the KEK 241, can be sent via either the one-to-one channel 234 or via the one-to-many channel 235.

KEK 241 may be shared amongst a group of UEs 210 and is used to protect delivery of message 242 containing an initial traffic key 243, which is sometimes referred to as a traffic encryption key generating key (TGK) or traffic encryption key (TEK). The traffic key 243 is used to derive session keys used to encrypt/decrypt content 263, 267 (such as a video, pictures, audio, text, and the like) conveyed in media stream 262 and 267. Since key distribution in the present invention includes delivery of a traffic key prior to session initiation, secure traffic can be received and conveyed immediately after the session description information 250 is conveyed.

Message 244 can be conveyed after the session initiation occurs using a session connection 236, one-to-many connection 235, or one-to-one connection 234. The message 244 is secured using KEK 241. Message 244 includes an updated traffic key 245. The updated traffic key 245 replaces traffic key 243 (e.g., when traffic key 243 is either expired or compromised) and is also used to derive session keys used to encrypt/decrypt content 263, 267 (such as a video, pictures, audio, text, and the like) conveyed in secure media stream 262 and 267. In one embodiment, the KEK 241 can be updated in a similar fashion to how the traffic key 243 is updated.

The session description message 254 can include information 252 that describes streaming media initialization parameters comprising media stream information for one or more secure media streams, such as stream 262 and 266. Although two streams are shown, any number of streams can be exchanged during a communication session, where each stream can have its own stream specific parameters. In one implementation, the streaming media initialization parameters can be separated into different sections, such as a session description section 256, a time description section 257, and a media description section 258. Each message 254 may contain more than one timing 257 and media 258 description. In one embodiment, the session description message 254 can conform to standards of the Session Description Protocol (SDP) (i.e., message 254 can conform to RFC 4566 of the IETF).

The security mechanism for the exchanged media streams 262, 266 can conform to any number of different media protocols. In one embodiment, media security 260 can conform to the Secure Real-time Transport Protocol (SRTP) (i.e., streams 262, 266 can conform to RFC 3771 of the IETF) or the Secure Real Time Control Protocol (SRTCP). The disclosure is not limited to use of SRTP or SRTCP, and a variety of alternatives, such as IPsec, can be in other contemplated embodiments.

The user equipment (UE) 210 can include various types of devices, which include mobile communication devices that communicate over wireless networks. For example, the UE 210 can include two-way radios, mobile telephones, and any device able to send/receive over a trunked radio system. The user equipment 210 (UE) can include a processor 211, memory 212, receiver 213, transmitter 214, audio transducer 215, display 216, input/output mechanisms 217, an analog/digital converter 218, a packetizer 219, a cryptography engine 220, a session establishment engine 221, a push-to component 222, sub-combinations of components 211-222, and additional components suitable for a communication device as described herein.

The processor 211 can execute computer program product instructions (e.g., software and firmware) stored in memory 212. Memory 212 can be a physical, non-transitory storage space. The receiver can be for receiving a secure stream of incoming media 266. That is, the IP address of the incoming media stream 266 can be bound to a port of the receiver 213. The transmitter 214 can be for transmitting a secure stream of outgoing media 262. The IP address of the outgoing media stream 262 can be bound to a port of the transmitter 214. The push-to component 222 can be for selectively toggling between transmission functionality of the transmitter and receiving functionality of the receiver. Push-to component 222 can include a push-to-talk function, a push-to-video function, a push-to-data function, and the like.

The audio transducer 215 can include a microphone and/or speaker, which are used to input and output audio. More specifically, one audio transducer (e.g., microphone) 215 can be for converting environment audio input to electronic signals that are ultimately conveyed in the secure stream 262 of outgoing audio. One audio transducer (e.g., speaker) 215 can be for converting audio contained in the secure stream of incoming audio 266 into audio output. The audio transducer (s) 215 can be coupled to the push-to component 222 in one embodiment.

The packetizer 219 can packetizing information in the secure outgoing stream 262 and can reconstruct received packets of the secure incoming stream 266.

The cryptography engine 220 can use session keys derived from the traffic key 243 to encrypt outgoing stream content 263 and decrypt incoming stream content 267. The session establishment engine 221 can establish a secure communication session comprising media stream 262 and 266. Moreover, the session establishment engine 221 can bind the KEK 242 to media streams 262 and 266. This implies that the session establishment engine 221 ultimately correlates each media stream 262, 266 to a corresponding traffic key 243. That is, the traffic key 243 itself may not be directly used to protect the traffic. The traffic (e.g., content 263, 267) may actually be protected using keys derived from the traffic key 243.

Figure 3:
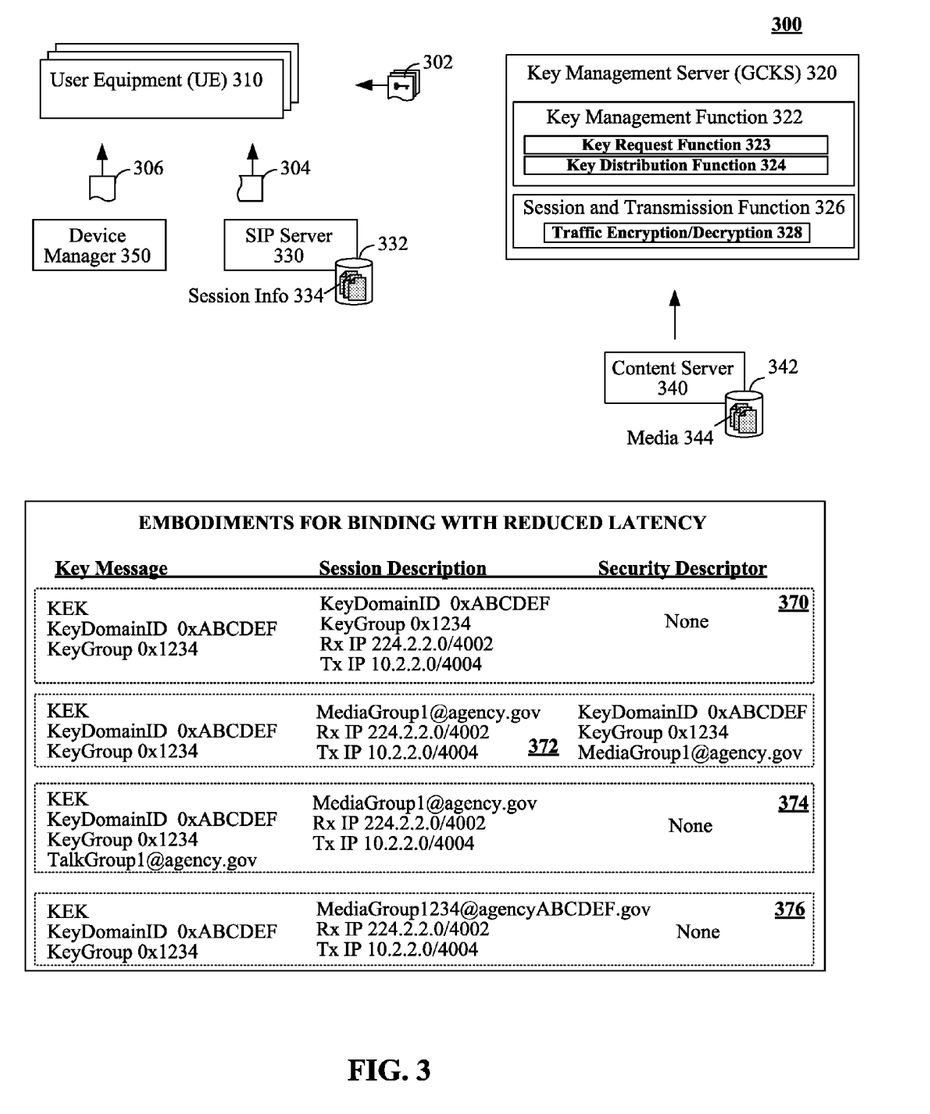
FIG. 3 shows a system for wireless group communications involving secure media streams that need to be bound to keys in accordance with an embodiment of the disclosure.

FIG. 3 shows a system 300 for wireless group communications involving secure media streams that need to be bound to keys in accordance with an embodiment of the disclosure. In system 300, key distribution 230, session description 230, and media security 260 can occur as previously detailed in FIG. 2.

System 300 addresses problems with call setup time delays when binding keys to media streams. In one embodiment, system 300 can be part of an architecture for a trunked or conventional public-safety communication system operating over Long Term Evolution (LTE) solution. Communications in system 300 can include group-based communication, such as those conducted through trunked talkgroups or conventional channels. In one configuration of system 300, a plurality of different trunked talkgroups or conventional channels can seamlessly share a set of frequencies, where coordination is performed using a control channel. It should be understood, however, that the binding solution presented herein can be utilized in any communication environment where keys are bound to media streams.

In one embodiment of system 300, users can communicate (uni-directionally and/or bi-directionally) with each other in real time and in groups (i.e., talkgroups, media groups, or other groups) of two or more individuals via user equipment (UE) 310.

Communications of system 300 can be SIP based ones initiated using session description messages 304 to convey session details. The session description message 304 can define key features of the media streams including codecs, IP addresses, ports (e.g., a User Datagram Protocol (UDP) port) bit rates, and other information. This information can be part of the session information 334 maintained in a data store 332 of SIP server 330.

The key-management server 320 can convey key messages 302 to the UE 310. Key-management server 320 can provide a number of key-management functions 322, which includes a key-request function 323 and a key-distribution function 324. The key management-server 320 can set up a common secret that is used as a traffic key. The common secret can be established using a variety of different techniques including, but not limited to MIKEY methods such as the pre-shared key (PSK), public key, or Dillie-Hellman key exchange methods as defined in RFC 3830, or other MIKEY methods such as the authenticated Dillie-Hellman (DH-HMAC) (e.g., RFC 4650), the reverse Rivest, Shamir and Adleman (RSA) (e.g., RFC 4738), and like methods. In other embodiments, the key-management functions 322 can conform to other key-management protocols, such as those used in APCO-P25 or TETRA two-way radio systems or other IETF-based standards, for example Group domain of Interpretation (RFC 3547) or Group Secure Association Key Management Protocol (RFC 4335).

In one embodiment, the key-management server 320 can be a group controller/key server (GCKS). Additionally, the key-management server can be implemented as a Broadcast Multicast Service Center (BM-SC) in one embodiment. The BM-SC can include a session and transmission function 326. Function 326 includes a traffic encryption/decryption component 328, which uses a traffic key to encrypt/decrypt sent and/or received media streams. In one embodiment, a content server 340 managing media 344 of a data source 342 can provide data that is encrypted and transmitted by the session and transmission function 326.

In one embodiment, a traffic encryption/decryption function 328 can be part of another component (e.g., a media manager function) that would receive keys from the key management server (GCKS) 320 in a manner identical to how the UE 310 receives its keys. In the embodiment, the function of the GCKS 320 is kept strictly to key management and does not extend to media protection. Other embodiments, arrangements, and derivatives of system 300 are contemplated.

FIG. 3 shows four alternatives or different embodiments 370, 372, 374, 376 for binding media streams to keys with reduced latency. Each of the embodiments 370, 372, 374, 376 provides a linkage between the media stream and a key. Significantly, each embodiment does not require that the key-management server possess a priori knowledge of the IP addresses of the media streams when sending the key message.

Figure 4A:
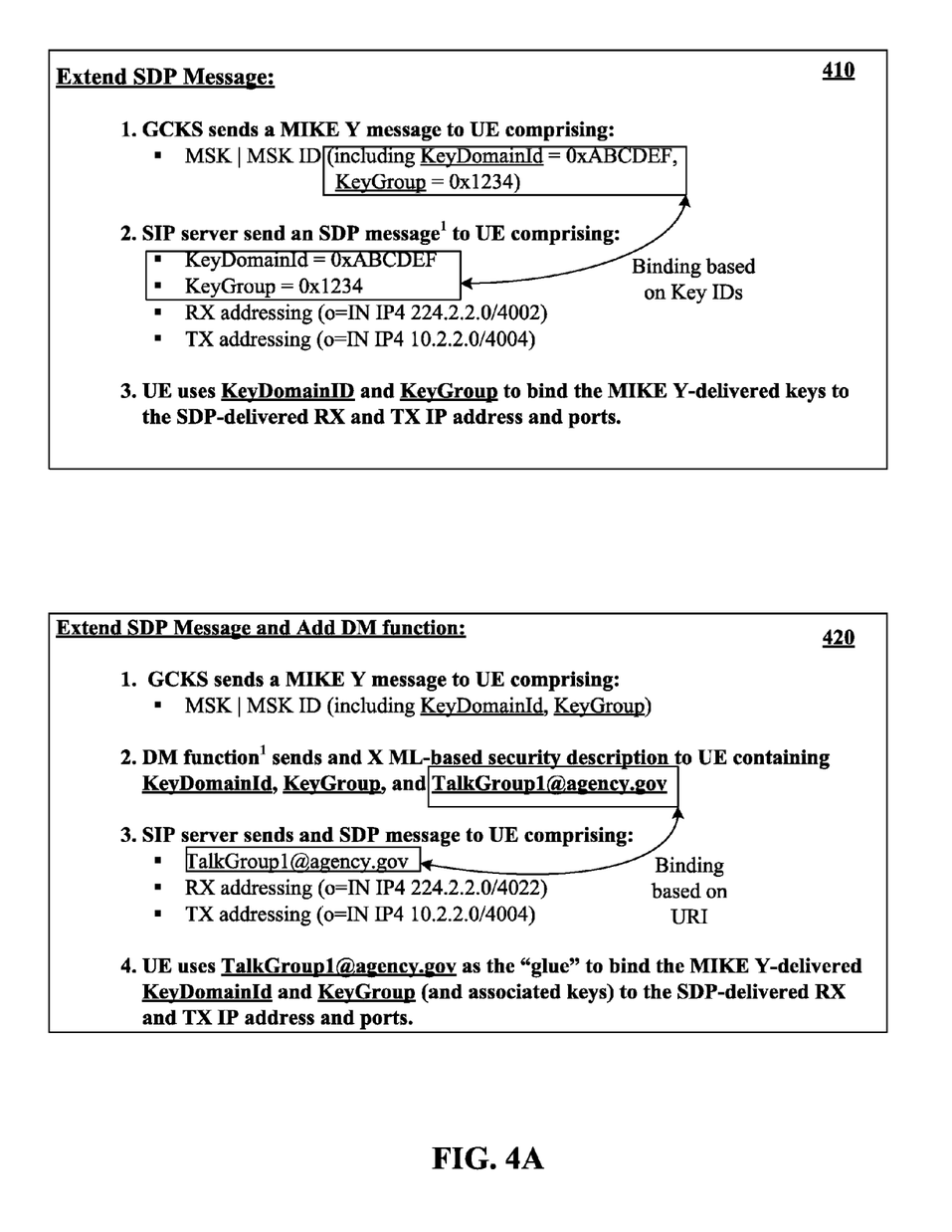
FIGS. 4A and 4B show embodiments for binding secure media streams to keys in accordance with the disclosure.

In embodiment 370, a KEK is sent within a key message 302, along with a KEK identifier. The KEK identifier embeds a KeyDomainID of 0xABCDEF and KeyGroup of 0x1234. The session description message can be extended to also include the KeyDomainID and KeyGroup. No security descriptor (message 306) is necessary since the UE 310 uses the KeyDomainID and Keygroup (embedded within the KEK Identifier) to bind the delivered keys to proper IP addresses and UDP ports. A MBMS-centric version (one that uses MBMS terminology) of embodiment 370 is shown as embodiment 410 of FIG. 4A.

In embodiment 372, a KEK can be conveyed in a key message 302, while the session description message 304 can include a uniform resource identifier (URI) that identifies the session and/or media group. As shown, MediaGroup1@agency.gov identifies the session. A security descriptor message 306 can be sent to the UE 310 from a device manager 350 as part of the Device Management (DM) function. Content of the message 306 can identify the KeyDomainID, KeyGroup, and URI. The UE 310 can use the URI (e.g., MediaGroup1@agency.gov) to bind the delivered keys to the Rx (224.2.2.0) and Tx IP addresses (10.2.2.0) of the media streams. It should be appreciated that, unlike the security descriptor of MBMS, which makes use of flow IDs containing IP address and port information (see 3GG document TS 33.346), embodiment 372 does not require the security descriptor sent by the DM 350 to contain information regarding IP addressing or port information. As such, the security descriptor 306 can be sent by DM 350 prior to session establishment (i.e., prior to SIP server 330 sending session description 304), thus avoiding the need to synchronize and substantially coordinate the actions of the SIP server 330 with the DM 350. A MBMS-centric version of embodiment 372 is shown as embodiment 420 of FIG. 4A.

Figure 4B:
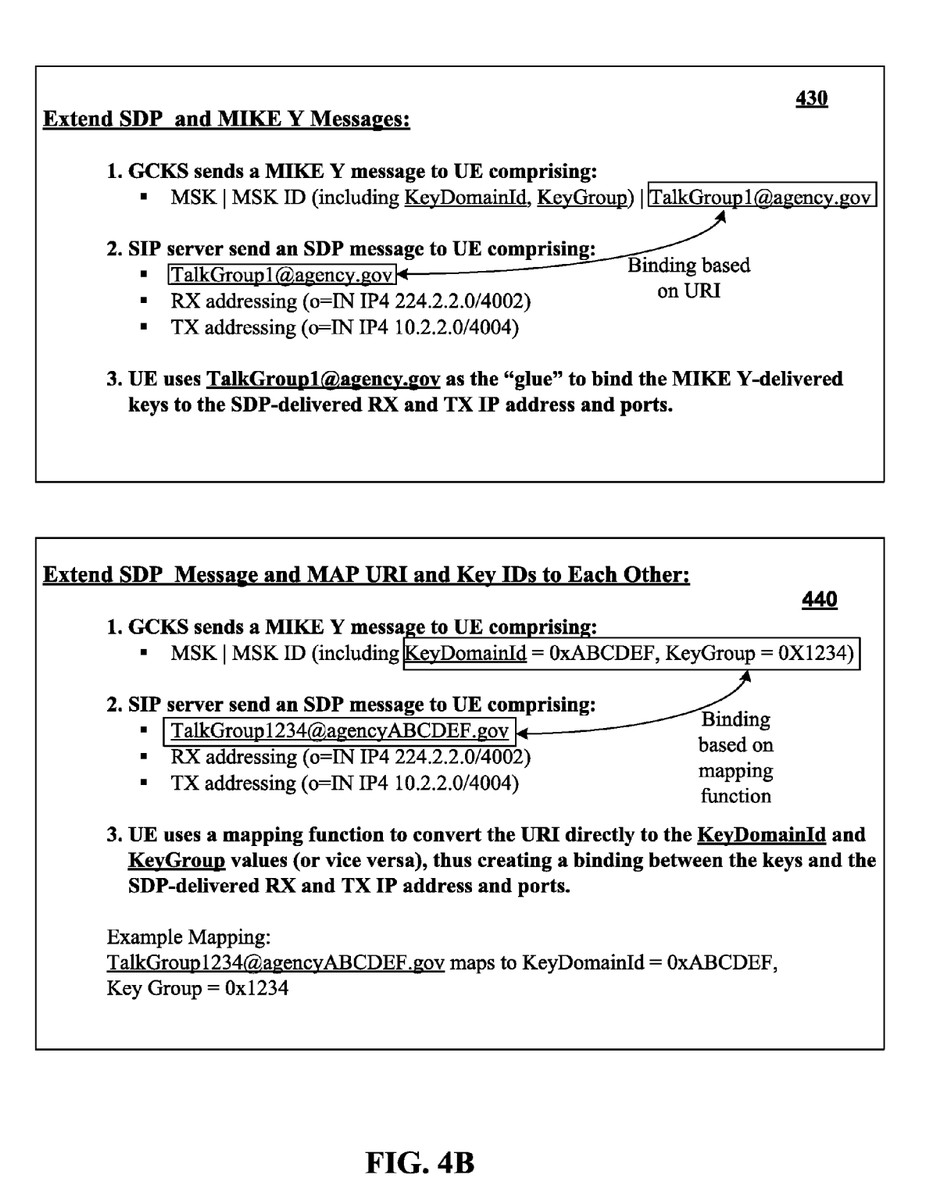

In embodiment 374, the session description message 304 and the key message 302 are both extended to include a URI. Specifically, a MediaGroup1@agency.gov URI is included in both messages 302, 304. This URI binds the keys to the session information. No security descriptor message 383 is needed in embodiment 374. A MBMS-centric version of embodiment 374 is shown as embodiment 430 of FIG. 4B.

In embodiment 376, a URI is used, which is generated with a mapping function. For example, the URI can be conveyed in a session description message 304, where the "1234" of MediaGroup1234 maps to the KeyGroup and where the "ABCDEF" of "agencyABCDEF.gov" maps to the KeyDomain. Any mapping function is possible for embodiment 376, and the illustrated one is not intended to be limiting. A MBMS-centric version of embodiment 376 is shown as embodiment 440 of FIG. 4B.

It should be understood that the embodiments 370, 372, 374, 376 each have advantages and disadvantages over one another, which causes different ones of the embodiments 370, 372, 374, 376 to be preferred for specific implementation instances. The below table provides an overview of some important properties of embodiments 370-376.

| Property | Embodiment 370 | Embodiment 372 | Embodiment 374 | Embodiment 376 |
|---|---|---|---|---|
| Uses "standard" MIKEY | YES | YES | NO | YES |
| Uses "standard" SDP | NO | NO | NO | NO |
| DM Message eliminated | YES | NO | YES | YES |
| Uses "standard" security descriptor | N/A | NO | N/A | N/A |
| SIP Server is security agnostic | NO | YES | YES | YES/NO |
| GCKS is SIP session agnostic | YES | YES | NO | NO/YES |

As to embodiment 376, whether the SIP server 330 is agnostic of security or of the GCKS is agnostic of SIP session depends on the mapping function that is used.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for binding security keys to media streams within user equipment (UE), said method comprising:
receiving a key message comprising a key-encryption-key (KEK);
receiving a session description message that describes streaming media initialization parameters comprising media stream information for one or more media streams, wherein for each of the media streams the media stream information comprises an IP address and a data port, wherein the session description message further comprises a linkage for binding the KEK to a corresponding one of the media streams; and
during session initialization, binding the key-encryption-key (KEK) to the media streams using the linkage of the session description message, wherein each of the media streams is secured using a traffic key conveyed to user equipment (UE) under protection of the key-encryption-key (KEK).

2. The method of claim 1, wherein the linkage comprises the KEK specific KeyDomainID and KeyGroupID or comprises an abstract representation of the KEK specific KeyDomainID and KeyGroupID, wherein the received key message comprises the key-encryption-key (KEK) also includes a KeyDomainID and a KeyGroupID, wherein the linkage comprises the KeyDomainID and KeyGroupID or comprises an abstract representation of the KeyDomainID and the KeyGroupID.

3. The method of claim 2, wherein the binding of the key-encryption-key (KEK) binds a group of KEKs having the KeyDomainID and KeyGroupID to the media streams.

4. The method of claim 2, wherein the linkage comprises the KeyDomainID and KeyGroupID.

5. The method of claim 1, wherein the linkage comprises a Uniform Resource Identifier (URI) for a media group of a communication session for which the media streams are bound, wherein the Uniform Resource Identifier (URI) is the abstract representation of a KeyDomainID and KeyGroupID of the key-encryption-key (KEK).

6. The method of claim 2, wherein the session description message is a Session Description Protocol (SDP) message extended to include values for the KeyDomainID and the KeyGroup.

7. The method of claim 2, wherein the session description message is a Session Description Protocol (SDP) message extended to include a Uniform Resource Identifier (URI) for a media group for a corresponding session, said method further comprising:
receiving from a device manager a security description message, wherein said security description message comprises values for the KeyDomainID, the KeyGroup, and the Uniform Resource Identifier (URI) for the media group.

8. The method of claim 1, wherein the key message is a Multimedia Internet KEYing (MIKEY) message extended to comprise a Uniform Resource Identifier (URI) for a media group for a corresponding session, and wherein the session description message is a Session Description Protocol (SDP) message extended to include the Uniform Resource Identifier (URI).

9. The method of claim 2, wherein the session description message is a Session Description Protocol (SDP) message extended to include a Uniform Resource Identifier (URI), said method comprising:
executing a mapping function against the uniform resource identifier to derive values for the KeyDomainID and the KeyGroup.

10. The method of claim 1, wherein the key message and the session description message comprise sufficient information to perform the binding of the KEK to the media streams without requiring additional information be conveyed to the user equipment (UE) within any other message.

11. The method of claim 1, wherein the key message is conveyed from a group controller/key server (GCKS), wherein the session description message is conveyed from a SIP server, and wherein a session for which the binding occurs is a bidirectional real-time secure voice communication conducted within a two-way radio talkgroup.

12. The method of claim 1, wherein a communication session for which the binding occurs is a Voice-Over-Internet Protocol (VoIP) session, wherein the media streams comprise secure audio streams for the Voice-Over-Internet Protocol (VoIP) session, wherein voice security for the secure audio streams conforms to a Secure Real-time Transport Protocol (SRTP)-based standard.

13. The method of claim 1, wherein a communication session for which the binding occurs is for a trunked or conventional public-safety over Long Term Evolution (LTE) system where the user equipment (UE) is directly connected to a two-way radio network, which the user equipment (UE) uses to receive and transmit the media streams during the communication session, wherein the media streams comprise at least one transmit media stream to be bound to a transmit function of the user equipment (UE) during the communication session and comprise at least one receive media stream to be bound to a receive function of the user equipment (UE) during the communication session.

14. A computer program product comprising a non-transitory computer readable storage medium having computer usable program code embodied therewith, the computer usable program code comprising:
computer usable program code which when executed by a processor is operable to receive a key message comprising a key-encryption-key (KEK);
computer usable program code which when executed by a processor is operable to receive a session description message that describes streaming media initialization parameters comprising media stream information for one or more media streams, wherein for each of the media streams the media stream information comprises an IP address and a data port, wherein the session description message further comprises a linkage for binding the KEK to a corresponding one of the media streams; and
computer usable program code which when executed by a processor is operable to, during session initialization, bind the key-encryption-key (KEK) to the media streams using the linkage of the session description message, wherein each of the media streams is secured using a traffic key conveyed to the user equipment (UE) under protection of the key-encryption-key (KEK).

15. User equipment (UE) for securely communicating via voice over broadband across a network comprising:

a session establishment engine for establishing a secure communication session comprising the secure stream of incoming audio and the secure stream of outgoing audio, wherein the session establishment engine binds a key-encryption-key (KEK) that is associated with a KeyDomainID and a KeyGroupID to the incoming and outgoing streams, where the binding of KEK to streams utilizes a linkage conveyed within a session description message.

16. The user equipment (UE) of claim 15, further comprising:
a transmitter for transmitting a secure stream of outgoing audio;
a receiver for receiving a secure stream of incoming audio, wherein the incoming and outgoing audio comprise real-time voice communications;
a push-to component for selectively toggling between transmission functionality of the transmitter and receiving functionality of the receiver;
a packetizer for packetizing information in the secure stream of outgoing audio and for reconstructing received packets of the secure stream of incoming audio;
at least one audio transducer for converting environment audio input to electronic signals that are ultimately conveyed in the secure stream of outgoing audio;
at least one audio transducer for converting audio contained in the secure stream of incoming audio into audio output;
a cryptography engine for utilizing a traffic key to encrypt outgoing audio for the secure stream of outgoing audio and to decrypt incoming audio of the secure stream of incoming audio, wherein the secure stream of incoming audio and the secure stream of outgoing audio, collectively referable to as secure media streams, each comprise an IP address and data port, wherein the user equipment (UE) is operable to receive the KeyDomainID and a KeyGroupID within a key message and wherein the user equipment (UE) is operable to receive the IP address and data port information for the session within a session description message, wherein the session description message further comprises the linkage for binding the KEK to a corresponding one of the secure media streams, wherein the linkage comprises the KeyDomainID and KeyGroupID or comprises an abstract representation of the KeyDomainID and KeyGroupID, wherein the traffic key is conveyed to the user equipment (UE) under protection of the key-encryption-key (KEK).

17. The user equipment (UE) of claim 15, wherein the session description message is a Session Description Protocol (SDP) message extended to include values for the KeyDomainID and the KeyGroup.

18. The user equipment (UE) of claim 15, wherein the session description message is a Session Description Protocol (SDP) extended to include a Uniform Resource Identifier (URI) for a media group for the session, wherein said user equipment (UE) is operable to receive from a device manager a security description message, wherein said security description message comprises values for the KeyDomainID, the Keygroup, and the Uniform Resource Identifier (URI) for the media group.

19. The user equipment (UE) of claim 15, wherein the KEK is conveyed within a key message extended to include a Uniform Resource Identifier (URI) for a media group for the session, and wherein the session description message is a Session Description Protocol (SDP) message extended to include the Uniform Resource Identifier (URI).

20. The user equipment (UE) of claim 15, wherein the session description message is a Session Description Protocol (SDP) message extended to include a Uniform Resource Identifier (URI), wherein said session establishment engine is operable to execute a mapping function against the uniform resource identifier (URI) to derive values for the KeyDomainID and the KeyGroup.

* * * * *